(12) United States Patent
Salguero et al.

(10) Patent No.: US 9,028,957 B2
(45) Date of Patent: May 12, 2015

(54) METAL SILICATE NANOSHEETS, METHODS OF MAKING METAL SILICATE NANOSHEETS, AND METHODS OF USE

(71) Applicant: University of Georgia Research Foundation, Inc., Athens, GA (US)

(72) Inventors: Tina T. Salguero, Athens, GA (US); Darrah Johnson-McDaniel, Athens, GA (US); Christopher A. Barrett, Athens, GA (US)

(73) Assignee: University of Georgia Research Foundation, Inc., Athens, GA (US)

( * ) Notice: Subject to any disclaimer, the term of this patent is extended or adjusted under 35 U.S.C. 154(b) by 0 days.

(21) Appl. No.: 14/024,706

(22) Filed: Sep. 12, 2013

(65) Prior Publication Data

US 2014/0072790 A1 Mar. 13, 2014

Related U.S. Application Data

(60) Provisional application No. 61/699,981, filed on Sep. 12, 2012.

(51) Int. Cl.
| | |
|---|---|
| *B32B 27/32* | (2006.01) |
| *B32B 5/16* | (2006.01) |
| *C04B 12/04* | (2006.01) |
| *C04B 14/04* | (2006.01) |
| *C04B 28/26* | (2006.01) |
| *C01B 33/24* | (2006.01) |
| *C09C 1/28* | (2006.01) |
| *C09C 1/00* | (2006.01) |
| *C01B 33/20* | (2006.01) |
| *C01B 33/32* | (2006.01) |

(52) U.S. Cl.
CPC . *C01B 33/24* (2013.01); *C09C 1/28* (2013.01); *C09C 1/0018* (2013.01); *C01P 2002/72* (2013.01); *C01P 2004/02* (2013.01); *C01P 2004/04* (2013.01); *C01P 2004/24* (2013.01); *C01B 33/20* (2013.01); *C01B 33/32* (2013.01); *Y10S 977/773* (2013.01)

(58) Field of Classification Search
CPC ............. C08K 3/34; C08K 3/346; C08K 3/36
USPC ................. 106/38.3, 600, 492, 481; 977/773; 428/220, 363, 402
See application file for complete search history.

(56) References Cited

U.S. PATENT DOCUMENTS

2009/0123734 A1* 5/2009 Pinnavaia et al. ............. 428/331

OTHER PUBLICATIONS

Accorsi et al. "The exceptional near-infrared luminescence properties of cuprorivaite (Egyptian blue)", Chem. Commun., 2009, 3392-3394.*

McKeown et al. "Linked four-membered silicate rings: vibrational analysis of Gillespite BaFeSi4O10 and implications for glass structure" Phys. Chem. Minerals, 1998, 25, 273-281.*

* cited by examiner

*Primary Examiner* — Prashant J Khatri
*Assistant Examiner* — Travis Figg
(74) *Attorney, Agent, or Firm* — Thomas|Horstemeyer, LLP

(57) ABSTRACT

Embodiments of the present disclosure relate to the preparation of colloidal dispersions or suspensions of inorganic materials with nano-sized and nano-structured morphologies, preferably the nanosheet form, compositions produced by this method, and the like.

11 Claims, 5 Drawing Sheets

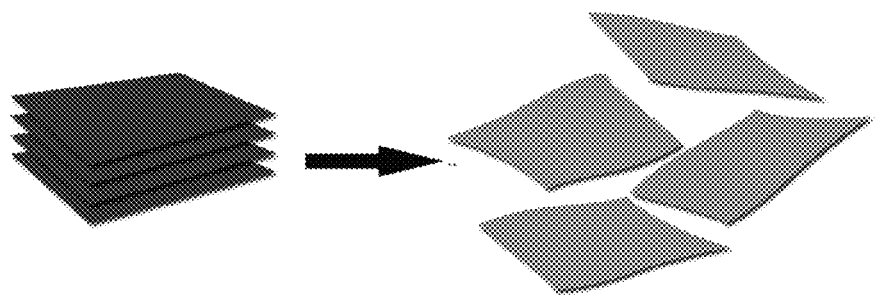
Figure 1.1
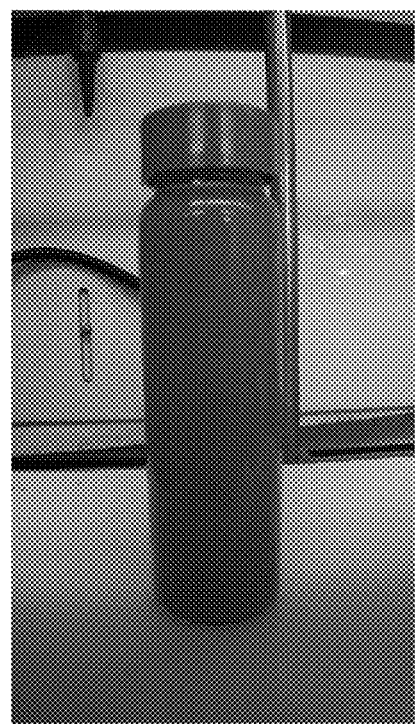
Figure 1.2

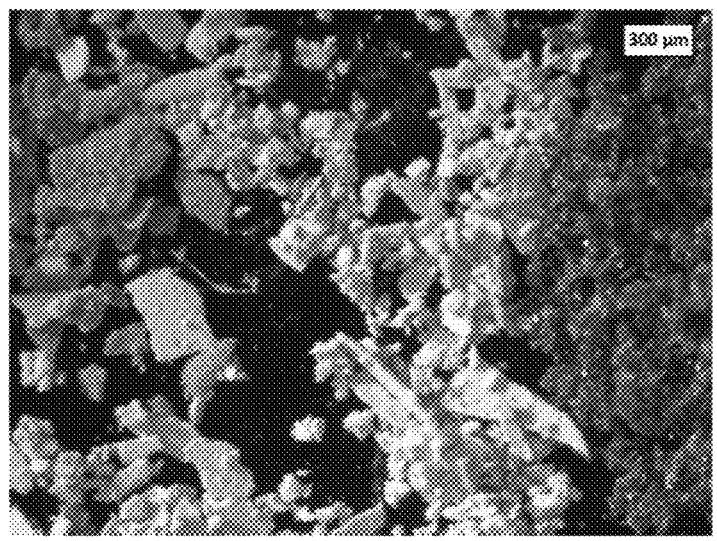
Figure 1.3
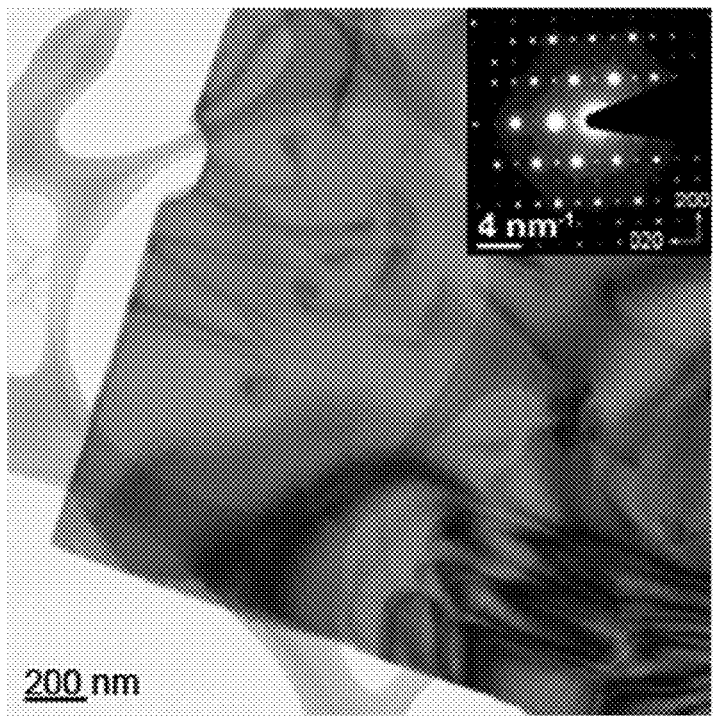
Figure 1.4

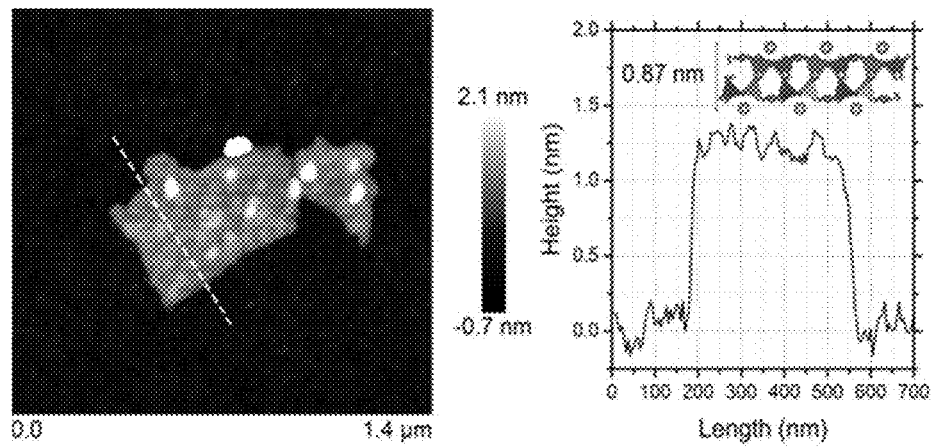
Figure 1.5
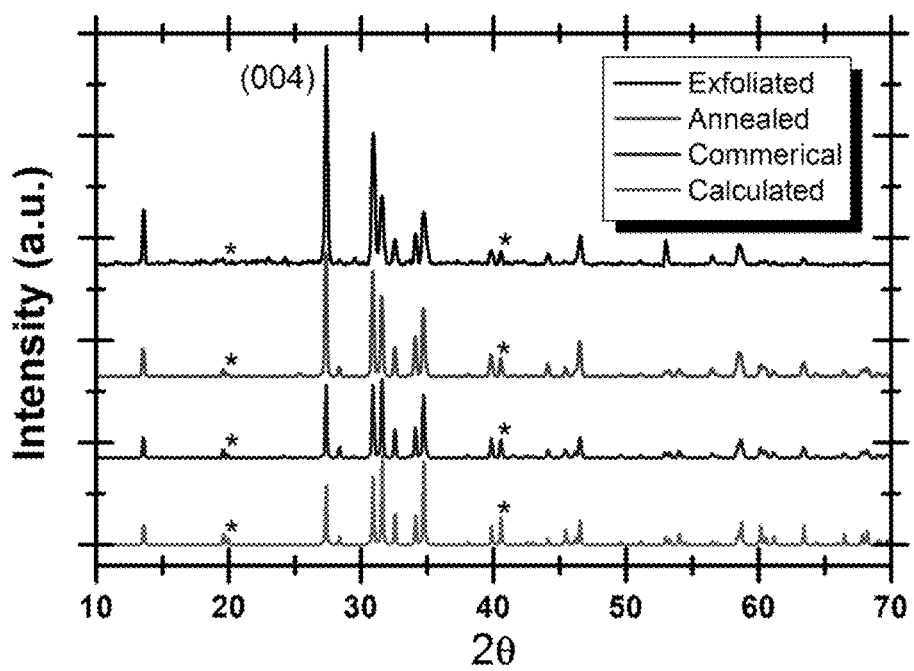
Figure 1.6

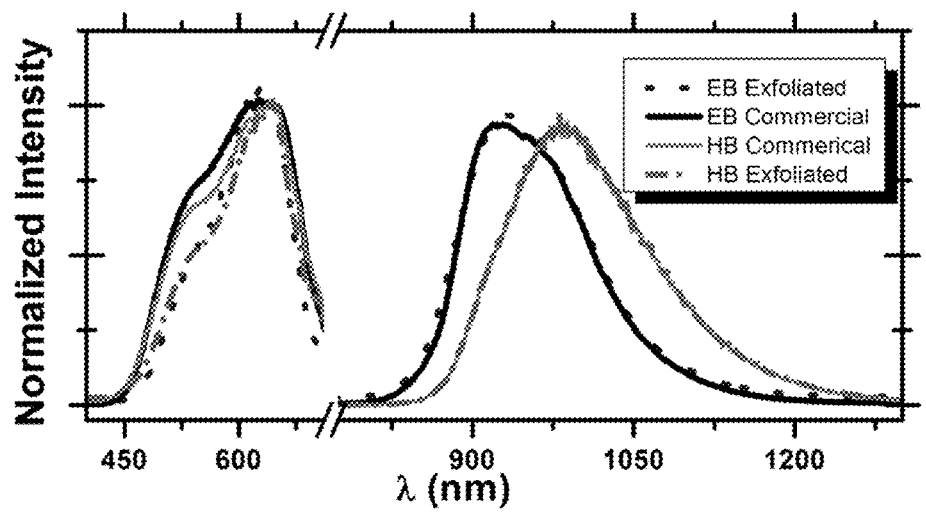
Figure 1.7
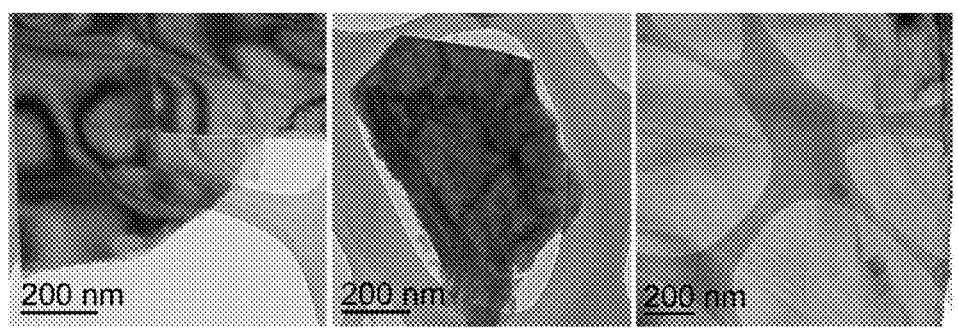
Figure 1.8

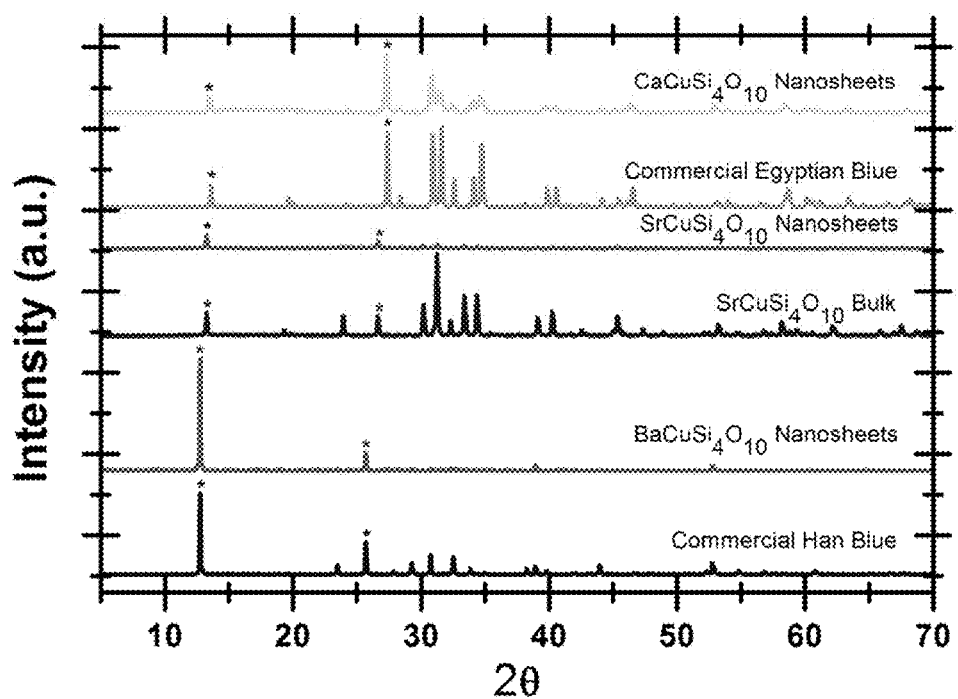
Figure 1.9

METAL SILICATE NANOSHEETS, METHODS OF MAKING METAL SILICATE NANOSHEETS, AND METHODS OF USE

CROSS-REFERENCE TO RELATED APPLICATION

This application claims priority to U.S. provisional application entitled "METAL SILICATE NANOSHEETS, METHODS OF MAKING METAL SILICATE NANOSHEETS, AND METHODS OF USE," having Ser. No. 61/699,981, filed on Sep. 12, 2012, which is entirely incorporated herein by reference.

BACKGROUND

Layered metal silicates belonging to the gillespite group, $ABSi_4O_{10}$, have been previously described. Other layered metal silicates with the formula $ABSi_2O_6$ also have been described. These and other publications additionally describe the advantageous properties of these materials, including their coloration for pigment applications.

SUMMARY

Embodiments of the present disclosure relate to the preparation of colloidal dispersions or suspensions of inorganic materials with nano-sized and nano-structured morphologies, preferably the nanosheet morphology form, compositions produced by this method, and the like.

An embodiment of the present disclosure includes a composition, among others, including a metal silicate material having the dimensions of a nanosheet that is 1 to 10 monolayers thick and has one or two lateral dimensions of about 100 nm to 100 µm. In an embodiment, one layer of the metal silicate material has a thickness of about 1 to 3 nm. In an embodiment, the metal silicate material is selected from the group consisting of: an alkaline earth copper silicate and a gillespite-type series silicate. In an embodiment, the alkaline earth copper silicate is selected from the group consisting of: $CaCuSi_4O_{10}$, $SrCuSi_4O_{10}$, $BaCuSi_4O_{10}$, and $BaCuSi_2O_6$. In an embodiment, the gillespite-type series silicate is defined by $ABSi_4O_{10}$, wherein A is selected from Ca, Ba, and Sr, and wherein B is selected from Cr and Fe. In an embodiment, the metal silicate material has the following formula: $A_{1-x}C_x B_{1-y}D_y Si_4O_{10}$, where A=Ca, Sr, Ba; C=Zn, Ti, lanthanide element; $0 \leq x \leq 1$; B=Cu, Cr, Fe; D=alkali metal; and $0 \leq y \leq 1$.

An embodiment of the present disclosure includes a method of making a metal silicate pigment, among others, including: delaminating bulk metal silicate to form a metal silicate material; and exfoliating the metal silicate material to form a metal silicate pigment having the dimensions of a nanosheet that is 1 to 10 monolayers thick and has one or two lateral dimensions of about 100 nm to 100 µm. In an embodiment, delaminating includes includes sonicating 100 nm to 100 µm. In an embodiment, delaminating includes mixing the bulk metal silicate with water at about 60 to 100° C. for about 1 to 10 days, or with water at room temperature for about 1 to 3 months. In an embodiment, exfoliating includes sonicating the metal silicate material in toluene for about 1 hour to 10 days. In an the metal silicate material in toluene for about 1 hour to 10 days. In an embodiment, an additional step includes annealing the metal silicate pigment at about 600 to 1200° C. in air for about 0.1 to 10 hours.

BRIEF DESCRIPTION OF THE DRAWINGS

Further aspects of the present disclosure will be more readily appreciated upon review of the detailed description of its various embodiments, described below, when taken in conjunction with the accompanying drawings.

FIG. 1.1 illustrates in a schematic way the exfoliation of a layered material into its constituent monolayers.

FIG. 1.2 illustrates a photograph showing the pearlescence of a colloidal dispersion of $CaCuSi_4O_{10}$ nanosheets in water while stirring in a vial. This optical effect is consistent with the presence of a nanosheet material.

FIG. 1.3 illustrates three forms of $CaCuSi_4O_{10}$ material. Illustrated at the right of the photograph is commercial bulk Egyptian blue pigment (purchased from Kremer Pigmente). Illustrated at the middle position of the photograph are isolated and dried $CaCuSi_4O_{10}$ nanosheets. Illustrated at the top left of the photograph is annealed $CaCuSi_4O_{10}$ nanosheets. Note the differences in color tone from deep blue (far right) (commercial Egyptian blue), to very pale blue (middle) ($CaCuSi_4O_{10}$ nanosheets), back to deep blue (left) (annealed $CaCuSi_4O_{10}$ nanosheets). The scale bar is 300 microns.

FIG. 1.4 illustrates the transmission electron microscopy (TEM) image of a $CaCuSi_4O_{10}$ nanosheet with straight edges. Inset: selected areas of electron diffraction patterns that matches crystalline $CaCuSi_4O_{10}$.

FIG. 1.5 illustrates a topographic atomic force microscopy (AFM) image of a $CaCuSi_4O_{10}$ nanosheet (left) and height profile along the dotted line (right).

FIG. 1.6 illustrates powder x-ray diffraction (XRD) data of (a) $CaCuSi_4O_{10}$ nanosheets, (b) annealed $CaCuSi_4O_{10}$ nanosheets, (c) commercial bulk Egyptian Blue (Kremer Pigmente), and (d) calculated $CaCuSi_4O_{10}$ pattern. The * indicates the [200] peak, which is weakest in the nanosheet sample (a) because of cleavage along the [001] planes.

FIG. 1.7 illustrates the excitation and emission spectra of powder samples of commercial Egyptian blue and Han blue pigments and the corresponding exfoliated $CaCuSi_4O_{10}$ and $BaCuSi_4O_{10}$ nanosheets.

FIG. 1.8 illustrates TEM images of (a) a $CaCuSi_4O_{10}$ nanosheet (left panel), (b) a $SrCuSi_4O_{10}$ nanosheet (middle panel), and (c) a $BaCuSi_4O_{10}$ nanosheet (right panel). The scale bar is 200 nanometers.

FIG. 1.9 illustrates powder XRD data of exfoliated and bulk $CaCuSi_4O_{10}$, $SrCuSi_4O_{10}$ and $BaCuSi_4O_{10}$. Asterisks denote the (002) and (004) peaks.

DETAILED DESCRIPTION

This disclosure is not limited to particular embodiments described, and as such may, of course, vary. The terminology used herein serves the purpose of describing particular embodiments only, and is not intended to be limiting, since the scope of the present disclosure will be limited only by the appended claims.

Where a range of values is provided, each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Embodiments of the present disclosure will employ, unless otherwise indicated, techniques of in organic chemistry, material science, and the like, which are within the skill of the art. Such techniques are explained fully in the literature.

The following examples are put forth so as to provide those of ordinary skill in the art with a complete disclosure and description of how to perform the methods and use the compositions and compounds disclosed and claimed herein. Efforts have been made to ensure accuracy with respect to numbers (e.g., amounts, temperature, etc.), but some errors and deviations should be accounted for. Unless indicated otherwise, parts are parts by weight, temperature is in ° C., and pressure is at or near atmospheric. Standard temperature and pressure are defined as 20° C. and 1 atmosphere.

Before the embodiments of the present disclosure are described in detail, it is to be understood that, unless otherwise indicated, the present disclosure is not limited to particular materials, reagents, reaction materials, manufacturing processes, dimensions, frequency ranges, applications, or the like, as such can vary. It is also to be understood that the terminology used herein is for purposes of describing particular embodiments only, and is not intended to be limiting. It is also possible in the present disclosure that steps can be executed in different sequence, where this is logically possible. It is also possible that the embodiments of the present disclosure can be applied to additional embodiments involving measurements beyond the examples described herein, which are not intended to be limiting. It is furthermore possible that the embodiments of the present disclosure can be combined or integrated with other measurement techniques beyond the examples described herein, which are not intended to be limiting.

It should be noted that, as used in the specification and the appended claims, the singular forms "a," "an," and "the" include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

Each of the applications and patents cited in this text, as well as each document or reference cited in each of the applications and patents (including during the prosecution of each issued patent; "application cited documents"), and each of the PCT and foreign applications or patents corresponding to and/or claiming priority from any of these applications and patents, and each of the documents cited or referenced in each of the application cited documents, are hereby expressly incorporated herein by reference. Further, documents or references cited in this text, in a Reference List before the claims, or in the text itself; and each of these documents or references ("herein cited references"), as well as each document or reference cited in each of the herein-cited references (including any manufacturer's specifications, instructions, etc.) are hereby expressly incorporated herein by reference.

Prior to describing the various embodiments, the following definitions are provided and should be used unless otherwise indicated.

Definitions

Delamination refers to separation of the constituent crystal layers into multilayer stacks, also known as nanoplatelets (thickness ≥10 nm).

Exfoliation refers to the complete separation of crystal layers into monolayers or few layer samples (thicknesses 0.5 to 10 nm).

Discussion

Embodiments of the present disclosure relate to the preparation of colloidal dispersions or suspensions of inorganic materials with nano-sized and nano-structured morphologies, preferably the nanosheet form. In an embodiment, the inorganic materials have the following characteristics: (1) they are metal-containing, (2) they have layered crystal structures, (3) they are intensely colored and thus useful as pigments, and (4) many are near-infrared emitters. The preferred class of materials is the alkaline earth copper silicates, including $CaCuSi_4O_{10}$ (colored component of the "Egyptian blue" pigment), $SrCuSi_4O_{10}$, $BaCuSi_4O_{10}$ (colored component of the "Chinese blue" or "Han blue" pigment), $BaCuSi_2O_6$ (colored component of the "Chinese purple" or "Han purple" pigment), and related derivatives in the gillespite-type series $ABSi_4O_{10}$ (A=Ca, Sr, Ba; B=Cu, Cr, Fe). Additional preferred compositions include "mixed" gillespite-type materials, including, but not limited to, $Ca_{1-x}Ba_xSi_4O_{10}$ (0≤x≤1), $Sr_{1-x}Ba_xSi_4O_{10}$ (0≤x≤1), $Sr_{1-x}Ca_xSi_4O_{10}$ (0≤x≤1), and so on. Further preferred compositions include the various substituted derivatives of these materials, such as $A_{1-x}C_x B_{1-y}D_ySi_4O_{10}$ (A=Ca, Sr, Ba; C=Zn, Ti, lanthanide element; 0≤x≤1; B=Cu, Cr, Fe; D=alkali metal; 0≤y≤1) and related compositions.

Several of the members of the metal silicate groups, in particular the alkali earth copper silicates $ACuSi_4O_{10}$ (A=Ca, Sr, Ba), can be exfoliated into nanosheets surprisingly easily. The exfoliation enables the solution-based processing of these nanomaterials, either as inks or fabricated into free-standing film-like materials or processed using techniques like layer-by-layer deposition.

For the purposes of the present disclosure, "nanosheets" are "two-dimensional" materials that can be several monolayers thick, but preferably a single monolayer thick, and have lateral dimensions from hundreds of nanometers to tens of microns.

The bulk metal silicate starting material can be transformed into particles with nanosheet morphology via delamination and exfoliation reactions. Delamination refers to separation of the constituent crystal layers into multilayer stacks or nanoplatelets (thicknesses ≥10 nm), and exfoliation refers to separation into monolayers or few-layer samples (thicknesses <10 nm). In at least some cases, this chemistry can be affected by simply stirring the metal silicates in hot water.

By analogy to other nanosheet materials like graphene and graphene oxide, metal silicate nanosheets can form colloidal dispersions or suspensions in a variety of solvents at ambient conditions, sometimes aided by surfactants or other stabilizing moieties. These dispersions can then be used to deposit the nanomaterials onto substrates of interest via solution-based processing methods like dip-coating, spin-coating, spray-coating, layer-by-layer deposition, ink jet printing, screen printing, etc. In addition, freestanding films or "papers" of these nanomaterials can be created by filtration methods, particularly in the case of nanosheets, which pack well onto porous supports due to the tendency of nanosheets to self assemble parallel to each other.

Applications

Pigment Formulations:

The traditional use of several of these layered metal silicate materials are as pigments. However, the granularity of the pigment particles has largely restricted their use to inlays, wall paintings (e.g., frescos), pottery, polychrome sculpture, "compact bodies" (beads, amulets, etc.). The availability of nano-sized and -structured metal silicates can provide more homogeneous and dispersible pigment formulations (which include a binder) that can be used for applications like painting on paper and canvas or for imparting color to items made of solid materials like polymers or concrete.

Ink Formulations:

The dispersibility of metal silicate nanosheets can permit the formulation of inks that are compatible with modern printing techniques like ink jet printing. The addition of small molecule or polymer surfactants can help tune the dispersion and viscosity properties of the nanosheet inks.

Surface Treatments:

The metal silicate nanosheet dispersions also may be used to deposit coatings via dip or spray coating and layer-by-layer deposition techniques. Such coatings can be applied even to high-aspect-ratio objects. The color of these coatings can be enhanced by annealing.

Security Inks:

The most interesting finding about metal silicate-based pigments in recent years has been their strong near infrared (NIR) emission properties. For example, Egyptian Blue has a remarkably large luminescence quantum yield of 10.5% at 910 nm. In combination with NIR imaging, this property provides a powerful method of identifying minute quantities of these pigments on artifact surfaces.[1]

A new use of metal silicate-based pigments can be NIR emitting inks for security applications, e.g., currency, credit cards, certificates, etc. The NIR emission can be imaged with a camera using the appropriate filter.

There are a limited number of molecules and materials that emit in the NIR regime (750-2500 nm). Examples include trivalent lanthanide ions [2] and PbS/CdS core/shell quantum dots.[3]

Optical Imaging:

Visible light is readily absorbed and scattered by the molecules in biological materials, which reduces the effectiveness of typical dyes and pigments in imaging applications that involve thick tissues and living animals. However, infrared photons can penetrate tissue much more readily and thus NIR emitting materials are being developed for optical imaging.[4] Metal silicate nanosheets could be suitable for this application.

Telecommunications:

There is significant interest in fiber-optic telecommunications systems based on NIR rather than visible photons. [3, 5] NIR emitting metal silicate nanosheets can be integrated into telecommunication devices and associated lasers and LED devices as the NIR source References, each of which are incorporated herein by reference:

[1] (a) Accorsi, G.; Verri, G.; Bolognesi, M.; Armaroli, N.; Clementi, C.; Milliani, C.; Romani, A. *Chem. Commun.* 2009, 3392-3394. (b) Verri, G. *Anal. Bioanal. Chem.* 2009, 394, 1011-1021. (c) Pozza, G.; Ajò, D.; Chiari, G.; D Zuane, F.; Favaro, M. *J. Cult. Herit.* 2000, 1, 393-398.

[2] Bünzli, J.-C. G.; Eliseeva, S. V. "Lanthanide NIR luminescence for telecommunications, bioanalyses and solar energy conversion" *J. Rare Earths* 2010, 28, 824-842.

[3] Panzer, M. J.; Wood, V.; Geyer, S. M.; Bawendi, M. G.; Bulović, V. "Tunable Infrared Emission From Printed Colloidal Quantum Dot/Polymer Composite Films on Flexible Substrates" *J. Display Tech.* 2010, 6, 90-93.

[4] Baumes, J. M.; Gassensmith, J. J.; Giblin, J.; Lee, J.-J.; White, A. G.; Culligan, W. J.; Leevy, W. M.; Kuno, M.; Smith, B. D. "Storable, thermally activated, near-infrared chemiluminescent dyes and dye-stained microparticles for optical imaging" *Nature Chem.* 2010, 2, 1025-1030.

[5] Zhang, L.; Chen, D.; Jiao, X. "Monoclinic Structured BiVO$_4$ Nanosheets: Hydrothermal Preparation, Formation Mechanism, and Coloristic and Photocatalytic Properties" *J. Phys. Chem. B* 2006, 110, 2668-2673.

Discussion

Embodiments of the present disclosure provide for metal silicate pigments, methods of making the metal silicate pigment, methods of using the metal silicate pigment, and the like. In an embodiment, one or more types of metal silicate pigments can be used in ink formulations, surface treatments, security inks, optical imaging, telecommunications, archeometry, and spin-based quantum devices.

Embodiments of the present disclosure provide for a metal silicate pigment and the preparation of the metal silicate pigment. In an embodiment, the metal silicate pigment can have nano-sized and nano-structured morphologies. In an embodiment, the metal silicate pigment can be a nanosheet that can be 1 to 10 monolayers thick. In an embodiment, the metal silicate pigment can have one or two lateral dimensions of about 100 nm to 100 μm. In an embodiment, the metal silicate pigment can have a thickness of about 0.5 to 5 nm, about 1 to 3 nm, or about 1.4 to 1.6 nm.

In an embodiment, the metal silicate pigment can form colloidal dispersions or suspensions in a variety of solvents (e.g., water and the like) at ambient conditions, sometimes aided by surfactants or other stabilizing moieties. These dispersions can then be used to deposit one or more types of metal silicate pigments onto a substrate of interest via solution-based processing methods like dip-coating, spin-coating, spray-coating, layer-by-layer deposition, ink jet printing, screen printing, etc. In addition, freestanding films or "papers" of one or more metal silicate pigments can be created by filtration methods, particularly in the case of nanosheets, which pack well onto porous supports due to the tendency of nanosheets to self assemble parallel to each other.

In an embodiment, the metal silicate pigment can have the following characteristics: (1) they are metal-containing, (2) they have layered crystal structures, and (3) they are intensely colored and useful as pigments. In an embodiment, the metal silicate pigment can be an alkaline earth copper silicate or a gillespite-type series silicate. In an embodiment, the alkaline earth copper silicate can include: $CaCuSi_4O_{10}$ (colored component of the "Egyptian blue" pigment), $SrCuSi_4O_{10}$, $BaCuSi_4O_{10}$ (colored component of the "Chinese blue" or "Han blue" pigment), and $BaCuSi_2O_6$ (colored component of the "Chinese purple" or "Han purple" pigment). In an embodiment, the gillespite-type series silicate can include silicates having the following formula: $ABSi_4O_{10}$, where A can be Ca, Ba, or Sr and B can be Cr or Fe. Although some nanosheets are luminescent, embodiments of the metal silicate pigment have a color that generally corresponds to the color of the bulk metal silicate. Pigment coloration is based on the selective absorption and reflection of certain wavelengths of visible light, which is distinct from a photoluminescent characteristic. In addition, the metal silicate pigment can emit radiation in the near infrared region upon absorbance of visible light.

In an embodiment, the metal silicate pigment can be formed by delaminating bulk metal silicate to form a metal silicate material. In an embodiment, the metal silicate material can be multilayer stacks or nanoplatelets (thickness >10 nm) of the bulk metal silicate. In an embodiment, delaminating can include mixing the bulk metal silicate with water at about 60 to 100° C. for about 1 to 10 days.

After delamination, the metal silicate material is exfoliated to form a metal silicate pigment having the dimensions of a nanosheet as described herein. In an embodiment, exfoliation changes the metal silicate material from the delamination step into a material of only a few monolayers or a monolayer in thickness. In an embodiment, exfoliating can include sonicating the metal silicate material in a solvent such as toluene for about 1 hour to 10 days at ambient temperature.

In an embodiment, the metal silicate pigment can be annealed at about 600 to 1200° C. or about 900° C. in a gas (e.g., air) for about 0.1 to 100 hours. In an embodiment, the annealing of the metal silicate pigment brings out the color in the pigment, and that can correspond to the color of the original bulk metal silicate.

EXAMPLES

Example 1

Representative Preparations of $CaCuSi_4O_{10}$ and $SrCuSi_4O_{10}$ Nanosheets 0.5 g (1.33 mmol) of Egyptian Blue (obtained from Kremer Pigmente, Inc.) and 40 mL of deionized (Nanopure system) water were stirred at 80° C. for 5 days. This process causes the layered metal silicate starting material to exfoliate into nanosheets, as shown schematically in FIG. 1.1. The resulting dispersion exhibited pearlescent optical distortions when agitated (FIG. 1.2). This dispersion was allowed to sit undisturbed for 24 hours, and then can be decanted from the precipitated un-exfoliated particles. The resulting milky white dispersion was filtered and dried to provide a pale blue-gray powder (FIG. 1.3).

The morphology of individual $CaCuSi_4O_{10}$ nanosheets within this material was characterized by transmission electron microscopy (TEM) and selected area electron diffraction. The nanosheets are several microns in lateral dimensions and thin enough that the lacey carbon TEM grid is visible behind the nanosheet; in addition, the diffraction results indicate excellent crystallinity (FIG. 1.4).

This material was exfoliated further by sonication in toluene. Atomic force microscopy (AFM) characterization revealed nanosheets with a thickness of 1.2 to 1.4 nm (FIG. 1.5), consistent with $CaCuSi_4O_{10}$ monolayers with adsorbed water molecules. The chemical composition of the nanosheets was confirmed by x-ray diffraction and comparison with bulk $CaCuSi_4O_{10}$ (FIG. 1.6). Upon annealing at 900° C. in air, the $CaCuSi_4O_{10}$ nanosheets regained the brilliant blue color of the original Egyptian Blue pigment (FIG. 1.3).

In addition, the absorbance and emission properties of the $CaCuSi_4O_{10}$ nanosheets were examined. Like the original Egyptian blue pigment, the nanosheets emit radiation in the near infrared region (~910 nm) upon absorbance of visible light (FIG. 1.7).

$SrCuSi_4O_{10}$ nanosheets were prepared in an exactly analogous manner starting from 0.5 g of bulk $SrCuSi_4O_{10}$. A TEM image of a $SrCuSi_4O_{10}$ nanosheet is shown in FIG. 1.8 (middle panel), and corresponding powder XRD data is included in FIG. 1.9.

Example 2

Preparation of $BaCuSi_4O_{10}$ Nanosheets

A dispersion of 0.14 g Han blue pigment (from Kremer Pigments, Inc.) in 20 mL N-vinylpyrrolidone was ultrasonicated at 17 W for 1 hour. A TEM image of a $BaCuSi_4O_{10}$ nanosheet is shown in FIG. 1.8 (right panel), and corresponding powder XRD data is included in FIG. 1.9.

Example 3

Procedure for Making a $CaCuSi_4O_{10}$ Nanosheet Ink $CaCuSi_4O_{10}$ nanosheets (15 mg) were dispersed in N-methylpyrrolidone (5 mL) using bath sonication. The resulting ink can then be used for painting and printing applications.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. In an embodiment, the term "about" can include traditional rounding according to the measuring technique and the numerical value. In addition, the phrase "about 'x' to 'y'" includes "about 'x' to about 'y'".

While only a few embodiments of the present disclosure have been shown and described herein, it will become apparent to those skilled in the art that various modifications and changes can be made in the present disclosure without departing from the spirit and scope of the present disclosure. All such modification and changes coming within the scope of the appended claims are intended to be carried out thereby.

We claim at least the following:

1. A composition, comprising:
   a metal silicate material having the dimensions of a nanosheet that is 1 to 10 monolayers thick and has one or two lateral dimensions of about 100 nm to 100 μm, wherein the metal silicate material is selected from the group consisting of: an alkaline earth copper silicate, a gillespite series silicate, and the metal silicate material has the following formula: $A_{1-x}C_xB_{1-y}D_ySi_4O_{10}$, where A=Ca, Sr, Ba; C=Zn, Ti, lanthanide element; $0 \le x \le 1$; B=Cu, Cr, Fe; D=alkali metal; and $0 \le y \le 1$.

2. The composition of claim 1, wherein one layer of the metal silicate material has a thickness of about 1 to 3 nm.

3. The composition of claim 1, wherein the metal silicate material is alkaline earth copper silicate.

4. The composition of claim 3, wherein the alkaline earth copper silicate is $CaCuSi_4O_{10}$.

5. The composition of claim 3, wherein the alkaline earth copper silicate is $SrCuSi_4O_{10}$.

6. The composition of claim 3, wherein the alkaline earth copper silicate is $BaCuSi_4O_{10}$.

7. The composition of claim 3, wherein the alkaline earth copper silicate is $BaCuSi_2O_6$.

8. The composition of claim 1, wherein the metal silicate material is gillespite series silicate.

9. The composition of claim 1, wherein the metal silicate material has the following formula: $A_{1-x}C_xB_{1-y}D_ySi_4O_{10}$, where A=Ca; C=Ti; $0 \le x \le 1$; B=Cu, Cr, Fe; D=alkali metal; and $0 \le y \le 1$.

10. The composition of claim 1, wherein the metal silicate material has the following formula: $A_{1-x}C_xB_{1-y}D_ySi_4O_{10}$, where A=Sr; C=Ti, lanthanide element; $0 \le x \le 1$; B=Cu, Cr, Fe; D=alkali metal; and $0 \le y \le 1$.

11. The composition of claim 1, wherein the metal silicate material has the following formula: $A_{1-x}C_xB_{1-y}D_ySi_4O_{10}$, where A=Ba; C=Ti, lanthanide element; $0 \le x \le 1$; B=Cu, Cr, Fe; D=alkali metal; and $0 \le y \le 1$.

* * * * *